United States Patent
Abe et al.

(10) Patent No.: US 7,169,294 B2
(45) Date of Patent: *Jan. 30, 2007

(54) HYDROPROCESSING CATALYST AND USE THEREOF

(75) Inventors: Satoshi Abe, Saijo (JP); Akira Hino, Niihama (JP); Katsuhisa Fujita, Niihami (JP)

(73) Assignee: Nippon Ketjen Co., Ltd., Tokyo (JP)

( * ) Notice: Subject to any disclaimer, the term of this patent is extended or adjusted under 35 U.S.C. 154(b) by 216 days.

This patent is subject to a terminal disclaimer.

(21) Appl. No.: 10/250,604

(22) PCT Filed: Dec. 20, 2001

(86) PCT No.: PCT/EP01/15383

§ 371 (c)(1),
(2), (4) Date: Oct. 23, 2003

(87) PCT Pub. No.: WO02/053286

PCT Pub. Date: Jul. 11, 2002

(65) Prior Publication Data

US 2004/0050754 A1    Mar. 18, 2004

(30) Foreign Application Priority Data

Jan. 5, 2001  (JP) .............................. 2001-000485

(51) Int. Cl.
*C10G 45/04* (2006.01)
*B01J 23/00* (2006.01)

(52) U.S. Cl. ............................. 208/216 PP; 208/217; 208/251 H; 208/254 H; 502/255; 502/259; 502/263; 502/313; 502/314; 502/315; 502/322; 502/415; 502/439

(58) Field of Classification Search ................ 502/315, 502/322, 355, 415, 439, 255, 259, 263, 313, 502/314; 208/216 PP, 217, 251 H, 254 H
See application file for complete search history.

(56) References Cited

U.S. PATENT DOCUMENTS 2,889,287 A * 6/1959 Scott, Jr. ..................... 502/255
(Continued)

FOREIGN PATENT DOCUMENTS

CA         1 248 513         1/1989
(Continued)

OTHER PUBLICATIONS

International Search Report No. PCT/EP 01/15383 dated May 16, 2003.
(Continued)

*Primary Examiner*—Cam N. Nguyen
(74) *Attorney, Agent, or Firm*—Frank C. Eymard

(57) ABSTRACT

The invention pertains to a hydroprocessing catalyst suitable for the conversion of heavy hydrocarbon oils, which comprises 7–20 wt. % of Group VI metal, calculated as trioxide, and about 0.5–6 wt. % of Group VIII metal, calculated as oxide, on a carrier comprising alumina, the catalyst having a surface area of about 100–180 m$^2$/g, a total pore volume of about 0.55 ml/g or more, a % PV(>200 Å d) of at least about 50%, a % PV(>1,000 Å d) of at least about 5%, a % PV(100–1,200 Å d) of at least about 85%, a % PV(>4,000 Å d) of about 0–2%, and a % PV(>10,000 Å d) of about 0–1%. The catalyst of the present invention shows improved metals and asphaltene removal, combined with appropriate sulfur, nitrogen, and Conradson carbon removal. Additionally, the catalyst shows a decrease in sediment formation and an improved conversion in ebullating bed operations. In fixed bed operation, the catalyst produces product with an improved storage stability. The invention also pertains to a process for hydroprocessing heavy hydrocarbon feeds with the catalyst according to the invention in fixed bed or ebullating bed operation.

12 Claims, 1 Drawing Sheet

U.S. PATENT DOCUMENTS

| | | | | |
|---|---|---|---|---|
| 3,417,030 | A | * 12/1968 | Gleim et al. | 502/255 |
| 3,898,155 | A |   8/1975 | Wilson | 208/216 |
| 3,993,601 | A | * 11/1976 | Long et al. | 502/303 |
| 4,119,531 | A | * 10/1978 | Hopkins et al. | 208/251 H |
| 4,301,037 | A |  11/1981 | Sanchez et al. | 252/462 |
| 4,322,829 | A |   3/1982 | Davis, Jr. et al. | 367/178 |
| 4,395,329 | A |   7/1983 | Le Page et al. | 208/251 H |
| 4,414,141 | A |  11/1983 | Schindler | 502/314 |
| 4,419,275 | A | * 12/1983 | Yoshida et al. | 502/322 |
| 4,434,048 | A |   2/1984 | Schindler | 208/112 |
| 4,454,026 | A |   6/1984 | Hensley, Jr. et al. | 208/251 H |
| 4,499,203 | A |   2/1985 | Toulhoat et al. | 502/247 |
| 4,657,663 | A | * 4/1987 | Gardner et al. | 208/210 |
| 4,720,472 | A | * 1/1988 | Parrott | 502/211 |
| 4,837,193 | A | * 6/1989 | Akizuki et al. | 502/242 |
| 4,846,961 | A | * 7/1989 | Robinson et al. | 208/216 PP |
| 5,187,138 | A | * 2/1993 | Davis | 502/255 |
| 5,192,734 | A | * 3/1993 | Creighton et al. | 502/314 |
| 5,389,595 | A | * 2/1995 | Simpson et al. | 502/315 |
| 5,403,806 | A | * 4/1995 | Simpson | 502/211 |
| 5,416,054 | A | * 5/1995 | Dai et al. | 502/211 |
| 5,436,215 | A | * 7/1995 | Dai et al. | 502/317 |
| 5,453,411 | A | * 9/1995 | Dai et al. | 502/315 |
| 5,498,586 | A | * 3/1996 | Dai et al. | 502/313 |
| 5,545,602 | A |   8/1996 | Nelson et al. | 502/314 |
| 5,686,375 | A | * 11/1997 | Iyer et al. | 502/315 |
| 5,827,421 | A | * 10/1998 | Sherwood, Jr. | 208/112 |
| 5,906,731 | A | * 5/1999 | Abdo et al. | 208/216 R |
| 6,309,537 | B1 |  10/2001 | Harle et al. | 208/254 H |
| 6,387,248 | B2 | * 5/2002 | Sherwood et al. | 208/216 PP |

FOREIGN PATENT DOCUMENTS

| | | |
|---|---|---|
| EP | 567 272 B1 | 10/1993 |
| EP | 590 894 B1 | 4/1994 |
| FR | 2 787 040 | 6/2000 |
| GB | 1333665 | 10/1973 |
| JP | 2-48485 | 2/1990 |
| JP | 6-296879 | 10/1994 |
| NL | 8403107 | 2/1986 |
| WO | WO 99/58626 | 11/1999 |
| WO | WO 00/44856 | 8/2000 |

OTHER PUBLICATIONS van Kerkvoort, et al., "Determination of Dry-Sludge Content of Fuel Oils: Development of the Shell Hot Filtration Test (SHFT)," J. Inst. Pet., vol. 37, pp. 596-604 (1951).

English language translation of Japanese Laid-Open No. 1994-88081.

Derwent Abstract 94-016626/03 abstracting CA 2093412.

Derwent Abstract 93-338304/43 abstracting EP 567272.

English language translation of Japanese Laid-Open No. 1994-200261.

Derwent Abstract 95-011008/02 abstracting JP 62-96879.

* cited by examiner

HYDROPROCESSING CATALYST AND USE THEREOF

CROSS REFERENCE TO RELATED APPLICATIONS

This application is based on PCT Application Filing No. PCT/EPO1/15383, International Filing date Dec. 20, 2001, and claims priority from Japanese Patent Application No. 2001-485, filed Jan. 5, 2001

BACKGROUND OF THE INVENTION

1. Field of the Invention

The present invention relates to a hydroprocessing catalyst and its use in the hydroprocessing of heavy hydrocarbon oils.

2. Prior Art

Hydrocarbon oils containing 70 wt. % or more of components boiling above 450° C., in particular hydrocarbon oils containing 50 wt. % or more of components with a boiling point of 538° C. or higher, are called heavy hydrocarbon oils. These include atmospheric residue (AR) and vacuum residue (VR), which are produced in petroleum refining. It is desired to remove impurities such as sulfur from these heavy hydrocarbon oils by hydroprocessing, and/or to convert them into lighter oils, which have a higher economic value. Depending on the properties of the feed, this is advantageously done in fixed bed or in ebullating bed operation.

Various catalysts have been proposed for this purpose in the art. Generally, these catalysts are capable of removing sulfur, Conradson carbon residue (CCR), various metals, nitrogen and/or asphaltenes. However, it was found that the decomposition of asphaltenes, which are aggregates of condensed aromatic compounds, is generally accompanied by the formation of sediment and sludge. Sediment can be determined by the Shell hot filtration solid test (SHFST) (see Van Kerknoort et al., *J. Inst. Pet.*, 37, 596 604 (1951)). Its ordinary content is said to be about 0.19 to 1 wt. % in product with a boiling point of 340° C. or higher collected from the bottom of a flash drum.

Sediment formed during ebullating bed hydroprocessing may settle and deposit in such apparatuses as heat exchangers and reactors, and because it threatens to close off the passage, it may seriously hamper the operation of these apparatuses.

Japanese Patent Laid-Open No. 1994-88081 discloses a hydroprocessing method for heavy hydrocarbon oils using a catalyst with a specific pore size distribution. In this method a catalyst is used with 3 to 6 wt. % of a Group VIII metal oxide, 4.5 to 24 wt. % of a Group VIB metal oxide, and 0 to 6 wt. % of phosphorus oxides loaded onto a porous alumina carrier which has a specific surface area of 165 to 230 $m^2$/g, a total pore volume of 0.5 to 0.8 ml/g, and a pore size distribution wherein 5% or less of the total pore volume is present in pores with a diameter less than 80 Å, 65–70% of the total pore volume present in pores with a diameter below 250 Å is present in a range of 20 Å below the MPD to 20 Å above the MPD, and 22–29% of the total pore volume is present in pores with a diameter of more than 250 Å.

However, although this method can achieve efficient hydrodesulfurization and Conradson carbon reduction, it does not solve the problem of sediment formation.

Japanese Patent Laid-Open No. 1994-200261 discloses a hydroprocessing method for heavy oils, and a catalyst used to implement this method. In this reference a catalyst was proposed with 2.2 to 6 wt. % of a Group VIII metal oxide and 7 to 24 wt. % of a Group VIB metal oxide on a porous alumina carrier, which catalyst has a surface area of 150–240 $m^2$/g, a total pore volume of 0.7 to 0.98 ml/g, and a pore size distribution wherein less than 20% of the total pore volume is present in pores with a diameter of less than 100 Å, at least 34% of the total pore volume is present in pores with a diameter of 100–200 Å, and 26–46% of the total pore volume is present in pores with a diameter of more than 200 Å. However, the present inventors have found that this catalyst shows a too high sediment formation.

Japanese patent publication 2-48485 describes a process for preparing an alumina catalyst carrier which has 0.6 to 0.85 ml/g of its pore volume in pores with a diameter below 500 Å and 0.1 to 0.3 ml/g of pore volume in pores with a diameter of 1,000 to 10,000 Å. The pore mode in the range up to 500 Å is 90–210 Å. The U-value, defined as D50/(D95-D5), is at least 0.55. The macropore volume of this carrier is very high, making it difficult to maintain stable hydrodesulfurization activity.

U.S. Pat. No. 4,395,329 describes a hydroprocessing catalyst for heavy oils which has a specific pore size distribution. The catalysts described in this reference have 10–25% of pore volume present in pores with a diameter above 10,000 Å. Especially when these catalysts are made by extrusion, this will detrimentally affect the strength of the catalyst and it is expected that it will be difficult to use the catalyst commercially.

As indicated above, in the improvement of ebullating bed hydroprocessing catalysts there is need for a catalyst which achieves a high level of contaminant removal, in particular metals and asphaltene removal, with low sediment formation and high conversion of the fraction boiling above 538° C.

In fixed bed operation, sediment formation is not much of a problem. However, also in fixed bed operation there is need for a catalyst which shows improved asphaltene removal and hydrodemetallization activity. Additionally, it would be attractive to have a catalyst which combines asphaltene removal with limited resin hydrogenation, because this leads to an improved storage stability of the product produced.

It has been found that these problems can be solved by the provision of a catalyst comprising a Group VI metal and a Group VIII metal on a carrier comprising alumina, which catalyst has a specific pore size distribution, including a limited pore volume in pores with a diameter above 4,000 Å, and a relatively high pore volume in pores with a diameter of 100–1,200 Å.

SUMMARY OF THE INVENTION

In one embodiment, the present invention comprises a hydroprocessing catalyst suitable for the conversion of heavy hydrocarbon oils comprising about 7–20 wt. % of Group VI metal, calculated as trioxide, and about 0.5–6 wt. % of Group VIII metal, calculated as oxide, on a carrier comprising alumina, the catalyst having the following physical properties: a surface area of about 100–180 $m^2$/g, a total pore volume of about 0.55 ml/g or more, a % PV(>200 Å d) of at least about 50%, a % PV(>1,000 Å d) of at least about 5%, a % PV(100–1,200 Å d) of at least about 85%, a % PV(>4,000 Å d) of about 0–2%, and a % PV(>10,000 Å d) of about 0–1%.

In a second embodiment, the present invention comprises a process for the hydroprocessing of heavy hydrocarbon feeds comprising bringing a heavy hydrocarbon feed into contact with the above hydroprocessing catalyst in the presence of hydrogen at a temperature of about 350–450° C. and a pressure of about 5–25 MPa.

Other embodiments of the invention include details concerning catalyst composition and hydroprocessing process conditions, all of which are described hereinbelow.

DETAILED DESCRIPTION OF THE INVENTION

Figure 1:
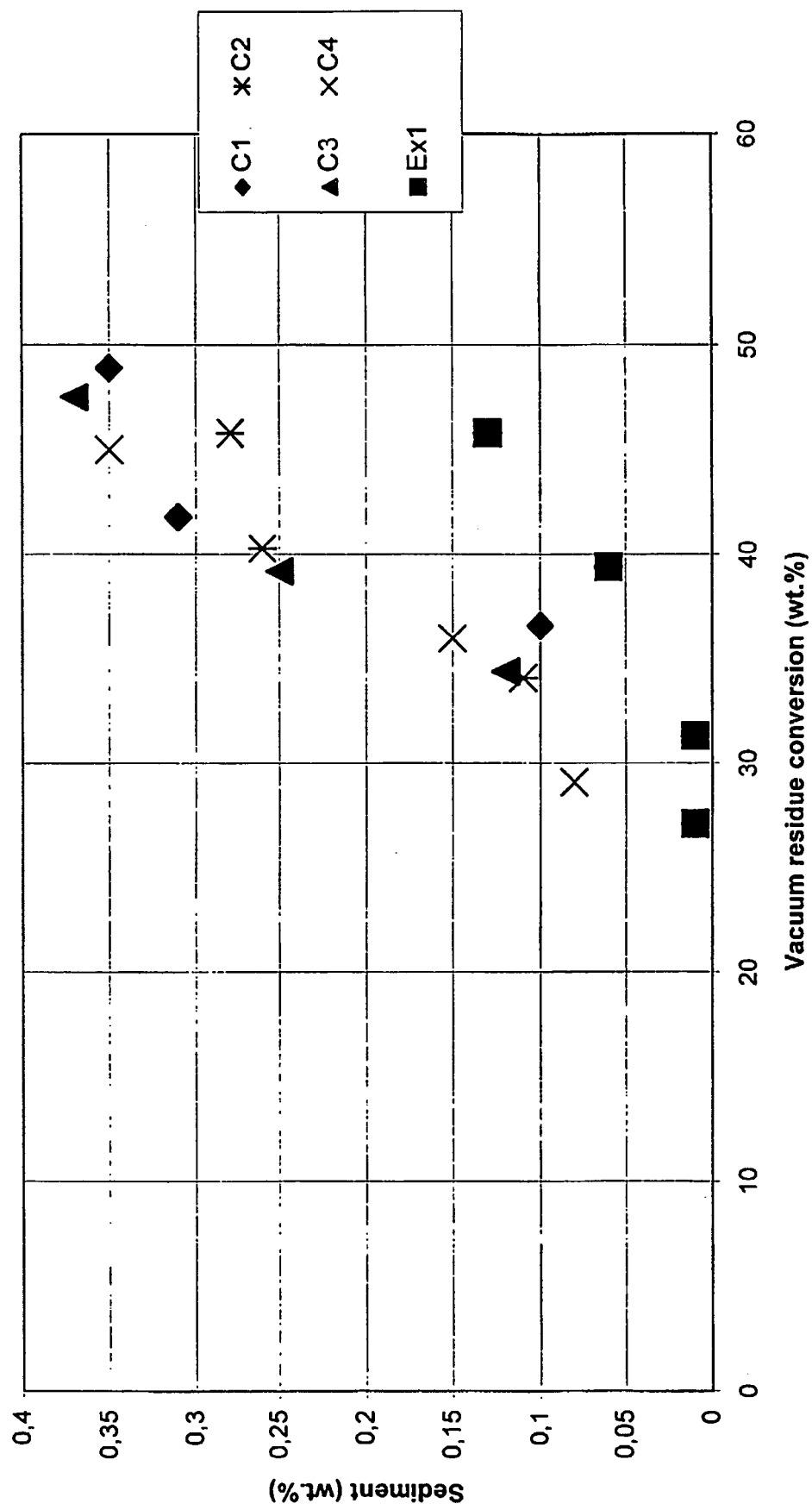
FIG. 1 shows the relation between the vacuum residue conversion rate and the sediment formation of the various catalysts of the examples.

The present invention relates to a catalyst suitable for the hydroprocessing of heavy hydrocarbon oils containing a large amount of impurities such as sulfur, Conradson carbon residue (CCR), metals, and asphaltene to effect hydrodesulfurization (HDS), hydrodemetallization (HDM), asphaltene reduction (HDAsp) and/or conversion into lighter products while inhibiting the formation of sediment detrimental to the operation and/or improving the storage stability of the product produced. The present invention also relates to a process for hydroprocessing heavy hydrocarbon oils using said catalyst.

The catalyst of the present invention shows improved metals and asphaltene removal, combined with appropriate sulfur, nitrogen, and Conradson carbon removal. The catalyst shows a significant decrease in sediment formation, which is important for ebullating bed operations. In ebullating bed operation, the catalyst shows an improved conversion, leading to the production of more valuable material boiling below 538° C. Particularly when used in fixed bed operation, the catalyst produces product with an improved storage stability. The invention also pertains to a process for hydroprocessing heavy hydrocarbon feeds with the catalyst according to the invention, particularly in fixed bed or in ebullating bed operation.

The catalyst of the present invention comprises catalytic materials on a porous carrier. The catalytic materials present on the catalyst according to the invention comprise a Group VIB metal and a Group VIII metal of the Periodic Table of Elements applied by Chemical Abstract Services (CAS system). The Group VIII metal used in this invention is at least one selected from nickel, cobalt, and iron. In view of performance and economy, nickel is especially preferred. As the Group VIB metals which can be used, molybdenum, tungsten, and chromium may be mentioned, but in view of performance and economy, molybdenum is preferred. The combination of molybdenum and nickel is particularly preferred for the catalytic materials of the catalyst according to the invention.

Based on the weight (100 wt. %) of the final catalyst including the carrier, the amounts of the respective catalytic materials are as follows.

The catalyst comprises about 7–20 wt. %, preferably about 8–16 wt. %, of Group VIB metal, calculated as trioxide. If less than about 7 wt. % is used, the activity of the catalyst is insufficient. On the other hand, if more than about 16 wt. %, in particular more than about 20 wt. % is used, the catalytic performance is not improved further.

The catalyst comprises about 0.5–6 wt. %, preferably about 1–5 wt. %, of Group VIII metal, calculated as oxide. If the amount is less than about 0.5 wt. %, the activity of the catalyst will be too low. If more than about 6 wt. % is present, the catalyst performance will not be improved further.

The carrier of the catalyst according to the invention comprises alumina. Preferably, the carrier contains less than about 5 wt. % of silica, more preferably less than about 2.5 wt. % of silica, still more preferably less than about 1.5 wt. %, most preferably less than about 0.5 wt. %. If the silica content of the carrier is too high, the performance of the catalyst will be affected.

As the alumina carrier in this invention, a carrier consisting essentially of alumina is preferred, the wording "consisting essentially of" being intended to mean that minor amounts of other components may be present, as long as they do not influence the catalytic activity of the catalyst. However, to improve catalyst strength as well as carrier acidity, the carrier can contain at least one material selected, for example, from oxides of silicon, titanium, zirconium, boron, zinc, phosphorus, alkali metals and alkaline earth metals, zeolite, and clay minerals in a small amount of less than about 5 wt. %, based on the weight of the completed catalyst, preferably less than 2.5 wt. %, more preferably less than about 1.5 wt. %, still more preferably less than about 0.5 wt. %.

It is important for achieving the desired objects in the hydroprocessing of a heavy hydrocarbon oil that the catalyst according to the invention meets specific requirements as to its surface area and pore size distribution.

The specific surface area of the catalyst is about 100 to about 180 m$^2$/g, preferably about 130 to about 170 m$^2$/g. If the specific surface area is less than 100 m$^2$/g, the catalyst performance is insufficient. On the other hand, if it is above 180 m$^2$/g, it will be difficult to obtain the required pore size distribution. Additionally, a specific surface area will result in an increase in hydrogenation activity, which, in turn, will lead to an increase in sediment formation. The specific surface area is determined by nitrogen ($N_2$) adsorption using the BET method.

The total pore volume of the catalyst as determined by mercury intrusion is at least about 0.55 ml/g, preferably about 0.6–0.9 ml/g. If it is less than about 0.55 ml/g, the performance of the catalyst is insufficient. The determination of the total pore volume and the pore size distribution via mercury penetration is effected at a contact angle of about 140° with a surface tension of about 480 dynes/cm, using, for example, a mercury porosimeter Autopore II (trade name) produced by Micrometrics.

At least about 50%, preferably about 60–80%, of the catalyst pore volume is present in pores with a diameter of above about 200 Å. If less than about 50% of the pore volume is present in this range, the catalyst's performance, especially as to asphaltene cracking, declines.

At least about 5% of the total pore volume is present in pores with a diameter above about 1000 Å, preferably between about 8 and about 30%, more preferably between about 8 and about 25%. If less than about 5% of the pore volume is present in this range, the asphaltene cracking activity decreases, which leads to increased sediment formation. If the percentage of pore volume present in pores with a diameter above about 1,000 Å is above about 25%, particularly above about 30%, the sediment formation may increase.

The catalyst according to the invention has at least about 85% of its pore volume in pores with a diameter between about 100 and about 1,200 Å. If the percentage of pore volume present in this range is less than about 85%, the hydrogenation of resins increases, which leads to an increase in sediment formation. Further, since the pore volume effective for bottoms conversion decreases, a % PV(100–1,200 Å d) below about 85% will lead to a decrease in bottom oil conversion.

The catalyst according to the invention has about 0–2% of its pore volume in pores with a diameter above about 4,000 Å, and about 0–1% of its pore volume in pores with a diameter above about 10,000 Å. If the percentage of pore volume in these ranges is above the stipulated value, the catalyst strength declines to a commercially unacceptable value. Additionally, the desulfurization activity would decline to an unacceptable level.

It is preferred for the catalyst according to the invention to have less than about 15%, more preferably less than 10%, of pore volume present in pores with a diameter below about 100 Å. If the precentage of pore volume in this range is above about 15%, the hydrogenation of non-asphaltenic compounds increases, leading to an increase in sediment formation.

The catalyst particles may have the shapes and dimensions common to the art. Thus, the particles may be spherical, cylindrical, or polylobal and their diameter may range from about 0.5 to about 10 mm. Particles with a diameter of about 0.5–3 mm, preferably about 0.7–1.2 mm, for example about 0.9–1 mm, and a length of about 2–10 mm, for example about 2.5–4.5 mm, are preferred. For use in fixed bed operation polylobal particles are preferred, because they lead to a reduced pressure drop in hydrodemetallization operations. Cylindrical particles are preferred for use in ebullating bed operations.

The carrier to be used in the catalyst according to the invention can be prepared by processes known in the art. A typical production method for a carrier comprising alumina is coprecipitation of sodium aluminate and aluminium sulfate. The resulting pseudoboehmite gel is dried, extruded, and calcined, to obtain an alumina carrier. A particular method of producing the carrier is described below.

At first, a tank containing tap water or warm water is charged with an alkali solution of sodium aluminate, aluminium hydroxide or sodium hydroxide, etc., and an acidic aluminium solution of aluminium sulfate or aluminium nitrate, etc. is added for mixing. The hydrogen ion concentration (pH) of the mixed solution changes with the progression of the reaction. It is preferable that when the addition of the acidic aluminium solution is completed, the pH is about 7 to about 9, and that during mixing, the temperature is about 60 to about 75° C.

Then, the obtained alumina hydrate gel is separated from the solution and washed using an industrially widely used method, for example, using tap water or warm water, to remove the impurities in the gel. Then, the gel is shaped into particles in a manner known in the art, e.g., by way of extrusion, beading or pelletizing.

Finally, the shaped particles are dried and calcined. The drying condition is room temperature to about 200° C., generally in the presence of air, and the calcining condition is about 300 to about 950° C., preferably about 600 to about 900° C., generally in the presence of air, for a period of 30 minutes to six hours.

By the above production method, it is possible to obtain a carrier having properties which will give a catalyst with the surface area, pore volume, and pore size distribution characteristics specified above. The surface area, pore volume, and pore size distribution characteristics can be adjusted in a manner know to the skilled person, for example by the addition during the mixing or shaping step of an acid, such as nitric acid, acetic acid or formic acid, or other compounds as molding auxiliary, or by regulating the water content of the alumina gel by adding or removing water.

It is preferred that the specific surface area of the alumina carrier before it is loaded with metal components is about 100 to about 180 m$^2$/g, preferably about 130 to about 170 m$^2$/g. Furthermore, it is preferred that the total pore volume is about 0.55 ml/g or more, more preferably about 0.6 to about 0.9 ml/g.

The Group VIB metal components and Group VIII metal components can be incorporated into the catalyst carrier in a conventional manner, e.g., by impregnation and/or by incorporation into the support material before it is shaped into particles. At this point in time it is considered preferred to first prepare the carrier and incorporate the catalytic materials into the carrier after it has been dried and calcined. The metal components can be incorporated into the catalyst composition in the form of suitable precursors. For the Group VIB metals, ammonium heptamolybdate, ammonium dimolybdate, and ammonium tungstenate may be mentioned as suitable precursors. Other compounds, such as oxides, hydroxides, carbonates, nitrates, chlorides, and organic acid salts, may also be used. For the Group VIII metals, suitable precursors include oxides, hydroxides, carbonates, nitrates, chlorides, and organic acid salts. Carbonates and nitrates are particularly suitable. The impregnation solution, if applied, may contain other compounds the use of which is known in the art, such as organic acids, e.g., citric acid, ammonia water, hydrogen peroxide water, gluconic acid, tartaric acid, malic acid or EDTA (ethylenediamine tetraacetic acid). It will be clear to the skilled person that there is a wide range of variations on this method. Thus, it is possible to apply a plurality of impregnating steps, the impregnating solutions to be used containing one or more of the component precursors that are to be deposited, or a portion thereof. Instead of impregnating techniques, dipping methods, spraying methods, etc. can be used. In the case of multiple impregnation, dipping, etc., drying and/or calcining may be carried out in between.

After the active metals have been incorporated into the catalyst composition, it is optionally dried, e.g., in air flow for about about 0.5 to about 16 hours at a temperature between room temperature and about 200° C., and subsequently calcined, generally in air, for about 1 to 6 hours, preferably about 1–3 hours at about 200–800° C., preferably about 450–600° C. The drying is done to physically remove the deposited water. The calcining is done to bring at least part, preferably all, of the metal component precursors to the oxide form.

It may be desirable to convert the catalyst, i.e., the Group VIB and Group VIII metal components present therein, into the sulfidic form prior to its use in the hydroprocessing of hydrocarbon feedstocks. This can be done in an otherwise conventional manner, e.g., by contacting the catalyst in the reactor at increasing temperature with hydrogen and a sulfur-containing feedstock, or with a mixture of hydrogen and hydrogen sulfide. Ex situ presulfiding is also possible.

The catalyst of the present invention is particularly suitable for the hydroprocessing of heavy hydrocarbon feeds. The catalyst is particularly suitable for ebullating bed hydrotreating of heavy feedstocks of which at least 50 wt. % boils above 538° C. (1,000° F.) and which comprise at least 2 wt. % of sulfur and at least 5 wt. % of Conradson carbon. The sulfur content of the feedstock may be above 3 wt. %. Its Conradson carbon content may be above 8 wt. %. The feedstock may contain contaminant metals, such as nickel and vanadium. Typically, these metals are present in an amount of at least 20 wtppm, calculated on the total of Ni and V, more particularly in an amount of at least 30 wtppm. The catalyst is also particularly suitable for fixed bed hydrotreating of heavy hydrocarbon feeds with such a boiling range that at least 70% by volume will boil above 450° C. The initial boiling point will generally be 300° C., frequently 350° C. The sulfur content of such feed generally is above 0.1 wt. % and will frequently be more than 1 wt. %. The nitrogen content generally is above 500 ppm and will frequently be in the range of 500 to 4,000 ppm. The feedstock contains contaminant metals such as vanadium, nickel, and iron, generally in amounts above 3 ppm, frequently in the range of 30 to 3,500 ppm, and more frequently in the range of 100–1,000 ppm, calculated as metal.

Suitable feedstocks include atmospheric residue, vacuum residue, residues blended with gas oils, particularly vacuum gas oils, crudes, shale oils, tar sand oils, solvent deasphalted oil, coal liquefied oil, etc. Typically they are atmospheric residue (AR), vacuum residue (VR), and mixtures thereof.

The process of this invention can be carried out in a fixed bed, in a moving bed, or in an ebullated bed. As indicated earlier, the catalyst of the present invention is particularly suitable for fixed bed and ebullating bed operations. The process conditions for the process according to the invention may be as follows. The temperature generally is about 350–450° C., preferably about 400–440° C. The pressure generally is about 5–25 MPA, preferably about 14–19 MPA. The liquid hourly space velocity generally is about 0.1–3 h−1, preferably about 0.3–2 h−1. The hydrogen to feed ratio generally is about 300–1,500 Nl/l, preferably about 600–1,000 Nl/l. The process is carried out in the liquid phase.

The invention will be elucidated below by way of the following examples, though it must not be deemed limited thereto or thereby.

EXAMPLE 1

(A) Carrier Preparation

A sodium aluminate solution and an aluminium sulfate solution were simultaneously added dropwise to a tank containing tap water, mixed at pH 8.5 at 65° C., and held for 70 minutes. The thus produced aluminate hydrate gel was separated from the solution and washed with warm water, to remove the impurities in the gel. Then, the gel was kneaded for about 20 minutes and extruded as cylindrical particles having a diameter of 0.9 to 1 mm and a length of 3.5 mm. The extruded alumina particles were calcined at 900° C. for 2 hours, to obtain an alumina carrier.

(B) Catalyst Preparation 100 g of the alumina carrier obtained in A were immersed in 100 ml of a citric acid solution containing 16.4 g of ammonium molybdate tetrahydrate and 9.8 g of nickel nitrate hexahydrate at 25° C. for 45 minutes, to obtain a carrier loaded with metallic components.

Subsequently the loaded carrier was dried at 120° C. for 30 minutes and calcined at 600° C. for 1.5 hours, to complete a catalyst. The amounts of the respective components in the produced catalyst and the properties of the catalyst are shown in Table 2.

COMPARATIVE EXAMPLE 1

(A) Carrier preparation

Example 1 was repeated, except that water glass (sodium silicate) was mixed into the alumina hydrate gel as a silica source. The silica content in the obtained carrier was 7 wt. %.

(B) Catalyst preparation

A catalyst was prepared from the silica-containing alumina carrier as described in Example 1. The amounts of the respective components in the produced catalyst and the properties of the catalyst are shown in Table 2.

COMPARATIVE EXAMPLE 2

(A) Carrier Preparation

Aluminium sulfate and a sodium aluminate solution were simultaneously added dropwise to a tank containing tap water at pH 7.5 and mixed at 70° C., while further sodium aluminate was added until the final pH became 9.5, after which the mixture was held for 70 minutes. The obtained alumina gel was extruded and calcined as described in Example 1, to obtain alumina particles.

(B) Catalyst Preparation

A catalyst was prepared from the alumina carrier as described in Example 1. The amounts of the respective components in the produced catalyst and the properties of the catalyst are shown in Table 2.

COMPARATIVE EXAMPLE 3

(A) Carrier Preparation

Aluminium sulfate was added to a tank containing tap water, and aluminium sulfate and a sodium aluminate solution were simultaneously added dropwise, mixed at 65° C. for about 60 minutes to obtain an alumina gel, and held for 70 minutes. The gel was processed further as described in Example 1 to obtain alumina particles.

(B) Catalyst Preparation

In this comparative example, 13.4 g of ammonium molybdate tetrahydrate and 11.2 g of nickel nitrate hexahydrate were added to and dissolved in 50 ml of ammonia water, and 100 g of the alumina carrier were immersed in 100 ml of the solution at 25° C. for 45 minutes, to obtain a carrier loaded with metallic components. Then, the loaded carrier was dried at 120° C. for 30 minutes and calcined at 600° C. for 1.5 hours in a kiln, to complete a catalyst. The amounts of the respective components in the obtained catalyst and the properties of the catalyst are shown in Table 2.

COMPARATIVE EXAMPLE 4

(A) Carrier Preparation

A carrier with large pores was produced as follows: The carrier obtained in Comparative Example 2 (A) was ground and kneaded again with the alumina gel of Comparative Example 2 (A), and the mixture was extruded and calcined as described for Example 1, to obtain a catalyst carrier having a desired pore size distribution.

(B) Catalyst Preparation

A catalyst was prepared from the alumina carrier as described in Example 1. The amounts of the respective components in the produced catalyst and the properties of the catalyst are shown in Table 2.

The catalysts of Example 1 and Comparative Examples 1 through 4 were tested in the hydroprocessing of a heavy hydrocarbon feedstock. The feedstock used in these examples was a Middle East petroleum consisting of 50 wt. % of atmospheric residue (AR) and 50 wt. % of vacuum residue (VR) obtained by fractionating a Middle East (Kuwait) oil. The composition and properties of the feed are given in Table 1.

TABLE 1

Feedstock composition

Middle East petroleum (VR:AR = 50:50)

| | |
|---|---|
| Sulfur (wt. %) | 4.79 |
| Nitrogen (wppm) | 2,890 |
| Metals - vanadium (wppm) | 85 |
| Metals - nickel (wppm) | 26 |
| Conradson Carbon residue (wt. %) | 16.2 |
| C7 - insolubles[1] (wt. %) | 6.0 |
| Vacuum residue[2] (wt. %) | 75 |
| Density (g/ml at 15° C.) | 1.0048 |

[1]Matter insoluble in n-heptane
[2]Fraction boiling above 538° C. in accordance with ASTM D 5307 (distillation gas chromatography)

The catalyst to be tested was packed into a fixed bed reactor. The feedstock was introduced into the unit in the liquid phase at a liquid hourly space velocity of 1.5 h−1, a pressure of 16.0 MPa, an average temperature of 427° C., with the ratio of supplied hydrogen to feedstock ($H_2$/oil) being kept at 800 Nl/l.

The oil product produced by this process was collected and analysed to calculate the amounts of sulfur (S), metals (vanadium+nickel) (M), and asphaltene (Asp) removed by the process, as well as the 538° C.+fraction. The relative volume activity values were obtained from the following formulae.

$$RVA = 100 * k(\text{tested catalyst})/k(\text{Comparative Catalyst 1})$$

wherein for HDS $$k = (LHSV/(0.7)) * (1/y^{0.7} - 1/x^{0.7})$$

and for HDM, asphaltene removal, $$k = LHSV * \ln(x/y)$$

with x being the content of S, M, or Asp in the feedstock, and y being the content of S, M, or Asp in the product.

The composition and properties of the catalysts and the test results are given in Table 2 below:

TABLE 2

| | Example 1 | Comp. Example 1 | Comp. Example 2 | Comp. Example 3 | Comp. Example 4 |
|---|---|---|---|---|---|
| Catalyst composition | | | | | |
| MoO3 (wt. %) | 11.9 | 11.4 | 11.8 | 9.7 | 11.3 |
| NiO (wt. %) | 2.0 | 2.1 | 2.1 | 2.4 | 2.2 |
| silica (wt. %) | 0 | 5.0 | 0 | 0 | 0 |
| alumina | balance | balance | balance | balance | balance |
| Impregnation via | citric acid | citric acid | citric acid | ammonia | citric acid |
| surface area (m²/g) | 147 | 195 | 173 | 162 | 133 |
| Total pore volume (ml/g) | 0.79 | 0.76 | 0.72 | 0.77 | 0.82 |
| % PV(>200 Å d) | 74 | 38 | 36 | 65 | 30 |
| % PV(>1000 Å d) | 11 | 9 | 12 | 2 | 14 |
| % PV(100–1200 Å d) | 90 | 79 | 89 | 99 | 91 |
| % PV(>4000 Å d) | 0.2 | 0.2 | 3.5 | 0.5 | 6.8 |
| % PV(>10.000 Å d) | 0.0 | 0.0 | 0.5 | 0.0 | 4.0 |
| Test results at LHSV = 1.5 h-1 and reaction temperature of 427° C. | | | | | |
| RVA HDS | 87 | 100 | 94 | 90 | 42 |
| RVA HDM | 124 | 100 | 92 | 90 | 106 |
| RVA Asp | 120 | 100 | 117 | 102 | 99 |
| Cracking rate 538° C.+ fraction (residue) | 39 | 41 | 40 | 40 | 36 |
| Sediment[1] | 0.06 | 0.29 | 0.26 | 0.25 | 0.15 |

[1]Sediment determined in accordance with the IP 375 method of the Institute of Petroleum As shown in Table 2, Example 1 achieves a desired decrease in sediment formation as compared to Comparative Example 1, while maintaining high demetallization and asphaltene removal activity. On the other hand, Comparative Examples 2 and 3 do not achieve a sufficient decrease in sediment formation. Comparative Example 4 shows a lower residue cracking rate and hydrodesulfurization performance.

The influence of the vacuum residue cracking rate on the sediment formation for the catalysts of Example 1 and comparative Examples 1–4 was studied by changing the space velocity. FIG. 1 shows the relation between the vacuum residue conversion rate and the sediment formation of the various catalysts (4 samples of each catalyst). As can be seen from FIG. 1, the catalyst according to the invention of Example 1 shows lower sediment formation at all conversion levels than the comparative catalysts. Additionally, the increase in sediment formation with increasing conversion is also lower for the catalyst of Example 1 than for the comparative catalysts.

In summary, as can be seen from Table 2 and FIG. 1, compared with the performance of the catalysts of Comparative Examples 1 through 4, the catalyst according to the invention prepared in Example 1 shows a high demetallization performance and a high asphaltene cracking performance in combination with a decrease in sediment formation even under high vacuum residue cracking rate conditions.

The invention claimed is:

1. A hydroprocessing catalyst useful for the conversion of heavy hydrocarbon oils comprising about 7–20 wt. % of Group VI metal, calculated as trioxide, and about 0.5–6 wt. % of Group VIII metal, calculated as oxide, on a carrier comprising alumina, the catalyst having the following physical properties: a surface area of about 100–180 m²/g, a total pore volume of about 0.55 ml/g or more, a %PV(>200 Å d) of at least 50%, a %PV(>1,000 Å d) of at least about 5%, a %PV(100–1,200 Å d) of at least about 85%, a %PV(>4,000 Å d) of about 0–2%, and a %PV(>10,000 Å d) of about 0–1%.

2. The catalyst of claim 1 wherein the %PV(>200 Å d) is about 60–80%.

3. The catalyst of claim 1 wherein the %PV(>1,000 Å d) is about 8–30%.

4. The catalyst of claim 1 wherein the %PV(>1,000 Å d) is about 8–25%.

5. The catalyst of claim 1 wherein the carrier consists essentially of alumina with less than about 2.5 wt. % of silica.

6. The catalyst of claim 1 wherein the carrier consists essentially of alumina with less than about 1.5 wt. % of silica.

7. The catalyst of claim 1 wherein the carrier consists essentially of alumina with less than about 0.5 wt. % of silica.

8. The catalyst of claim 1 wherein the Group VI metal is molybdenum and the Group VIII metal is nickel.

9. A process for the hydroprocessing of heavy hydrocarbon feeds comprising contacting a heavy hydrocarbon feed with a hydroprocessing catalyst of claim 1 in the presence of hydrogen at a temperature of about 350–450° C. and a pressure of about 5–25 MPa.

10. The process of claim 9 wherein the temperature is about 400–450° C. and the pressure is about 14–19 MPa.

11. The process of claim 9 wherein the catalyst is in the form of an ebullating bed.

12. The process of claim 9 wherein the catalyst is in the form of a fixed bed.

* * * * *